US010378609B2

(12) United States Patent
Threadgold (10) Patent No.: US 10,378,609 B2
(45) Date of Patent: Aug. 13, 2019

(54) MOUNT ASSEMBLY FOR ENGINEERING SERVICES (71) Applicant: Air Diffusion Agencies Pty Ltd, Beverley, South Australia (AU)

(72) Inventor: William Trevor Threadgold, Beverley (AU)

(73) Assignee: Air Diffusion Agencies Pty Ltd, Beverley (AU)

( * ) Notice: Subject to any disclaimer, the term of this patent is extended or adjusted under 35 U.S.C. 154(b) by 0 days.

(21) Appl. No.: 15/553,130

(22) PCT Filed: Feb. 26, 2016

(86) PCT No.: PCT/AU2016/000062
§ 371 (c)(1),
(2) Date: Aug. 23, 2017

(87) PCT Pub. No.: WO2016/134410
PCT Pub. Date: Sep. 1, 2016

(65) Prior Publication Data
US 2018/0058539 A1 Mar. 1, 2018

(30) Foreign Application Priority Data
Feb. 26, 2015 (AU) .............................. 2015900683

(51) Int. Cl.
*F16F 1/36* (2006.01)
*F16F 15/04* (2006.01)
(Continued)

(52) U.S. Cl.
CPC ............ *F16F 15/04* (2013.01); *F16F 1/3615* (2013.01); *F16F 1/3732* (2013.01);
(Continued)

(58) Field of Classification Search
USPC .......................................................... 248/638
See application file for complete search history.

(56) References Cited

U.S. PATENT DOCUMENTS 2,941,766 A * 6/1960 Van Ranst ............ F16F 1/3814
267/141.7
3,041,777 A * 7/1962 Schwartz ............. A47B 91/024
248/188.4
(Continued)

FOREIGN PATENT DOCUMENTS

CN 200979272 Y 11/2007
CN 203023383 U 6/2013
(Continued)

OTHER PUBLICATIONS

International Search Report and Written Opinion dated Mar. 18, 2016, issued in corresponding International Application No. PCT/AU2016/000062, filed Feb. 26, 2016, 8 pages.

*Primary Examiner* — Monica E Millner
(74) *Attorney, Agent, or Firm* — Christensen O'Connor Johnson Kindness PLLC (57) ABSTRACT

The present disclosure relates to a mount assembly for engineering services such as air handling units (AHU) of a heating, ventilating, and air-conditioning (HVAC) systems. In one form, the mount assembly comprises a an aperture comprising a female screw thread, and a resilient element comprising an item attachment point and a male screw thread adapted for threadable engagement with the female thread of the base so that the resilient element interposes the item attachment point and the-base.

12 Claims, 7 Drawing Sheets

(51) Int. Cl.
*F24F 13/24* (2006.01)
*F24F 13/32* (2006.01)
*F16F 1/38* (2006.01)
*F16F 1/373* (2006.01)
*F16F 1/44* (2006.01)

(52) U.S. Cl.
CPC .......... *F16F 1/3842* (2013.01); *F16F 1/3863* (2013.01); *F24F 13/24* (2013.01); *F24F 13/32* (2013.01); *F16F 1/44* (2013.01); *F16F 2230/24* (2013.01)

(56) References Cited

U.S. PATENT DOCUMENTS

| | | | | |
|---|---|---|---|---|
| 4,067,525 A * | 1/1978 | Allen | .................... | F16F 1/3732 248/632 |
| 5,042,765 A * | 8/1991 | Widerstrom | ........... | A47B 91/04 248/188.3 |
| 5,460,348 A * | 10/1995 | Cox | ......................... | F16M 5/00 248/237 |
| 6,631,878 B1 * | 10/2003 | Adam | ...................... | F16M 7/00 248/188.4 |
| 6,902,140 B1 * | 6/2005 | Huang | ...................... | E06C 7/44 248/188.2 |
| 2003/0071187 A1 * | 4/2003 | Herren | ................ | F16F 15/0275 248/638 |
| 2005/0116134 A1 * | 6/2005 | Lee | ......................... | D06F 37/20 248/650 |
| 2005/0257579 A1 * | 11/2005 | Conrad | ................. | D06F 39/125 68/23.1 |

FOREIGN PATENT DOCUMENTS

| | | |
|---|---|---|
| DE | 201 02 258 U1 | 11/2001 |
| WO | 2001/050069 A1 | 7/2001 |
| WO | 2014/190377 A1 | 12/2014 |

* cited by examiner

MOUNT ASSEMBLY FOR ENGINEERING SERVICES

PRIORITY DOCUMENTS

The present application claims priority from Australian Provisional Patent Application No. 2015900683, titled "A MOUNT ASSEMBLY FOR ENGINEERING SERVICES", and filed on 26 Feb. 2015, the content of which is hereby incorporated by reference in its entirety.

TECHNICAL FIELD

The present disclosure relates to a mount assembly for engineering services. In a particular form, the present disclosure relates to a mount assembly for an air handling unit (AHU) of a heating, ventilating, and air-conditioning (HVAC) system.

BACKGROUND

An AHU of a heating, ventilating, and air-conditioning (HVAC) system is one example of engineering services for a building. AHU's are commonly mounted in elevated positions, such as on moves or walls, or in or above ceilings.

In the event of seismic activity such as a tremor or an earthquake, it is known for engineering services to be dislodged from their mountings, with potentially disastrous consequences, such as falling from elevated mounting positions onto people below.

It is against this background and the problems and difficulties associated therewith that the present invention has been developed.

Certain objects and advantages of the present invention will become apparent from the following description, taken in connection with the accompanying drawings, wherein by way of illustration and example, an embodiment of the present invention is disclosed.

SUMMARY

According to a first aspect, there is provided a mount assembly for an engineering services item, the mount assembly comprising a base comprising a body, the body comprising an aperture therein, the aperture comprising an internal (i.e. female) screw thread, the mount assembly thither comprising a resilient element comprising an item attachment point and an external (i.e. male) screw thread adapted tot threadable engagement with the female thread of the base, so that the resilient element is screwed into the base, and interposes the item attachment point and the base.

For the purpose of this specification, the term 'item attachment point' should be considered to encompass any part designed to carry an external load.

In one form, the base comprises a collar which encircles the aperture, and which comprises at least a portion of the internal thread.

In one form, the base comprises a flange which extends outwardly from the collar, and which substantially encircles the collar.

In one form, the resilient element comprises a solid body of a resilient material.

In one form, the item attachment point comprises an attachment member, at least a portion of which is embedded in the resilient element.

In one form, the mount assembly further comprises a carriage depending from the base, and which is adapted to slide with respect to a support rail.

In one form, the carriage is adapted to slidably engage the rail.

In one form, the carriage comprises a solid portion of a resilient material.

In one form, the resilient material comprises an elastomeric material.

In one form, the base is made from a rigid material.

In one form, the resilient material comprises a moldable material.

In one form, the carriage of elastomeric material is formed by a molding process.

In one form, the carriage is molded to the base during the carriage's forming process. To this end, the carriage base will comprise features (male and female) about which the moldable resilient material can form to secure the carriage with respect to the base.

In one form, the resilient element of elastomeric material is formed by a molding process.

In one form, the attachment member is molded into the resilient element during the resilient element's forming process.

In one form, the item attachment member comprises a nut for a fastener.

In one form, the item attachment member comprises a bolt embedded by its head in the resilient element.

In one form, the resilient element is cylindrical, and the collar is cooperatively shaped.

In one form, in an alternative, the resilient element is conical.

According to a further aspect of the present invention, there is provided a mount assembly for an engineering services item, the mount assembly comprising a base, and a resilient element comprising an item attachment point, and which interposes the item attachment point and the base.

In one form, the base comprises a rail, and the resilient element comprises a carriage for running along the rail.

In one form, the attachment point comprises a threaded rod from which a load (engineering services item) can be suspended.

In one form, the threaded rod extends through the resilient element.

In one form, the threaded rod extends through an aperture in the rail.

In one form, the rail comprises a channel comprising a slot. In one form, both the channel and slot extend in a direction of elongation of the rail.

In one form, the rail comprises a floor, a pair of opposing sides, and an inwardly directed lip depending from each of the opposing sides.

In one form, the carriage comprises a body of resilient material, where the body is generally cuboid, comprising a pair of sides and a pair of ends.

In one form, wherein each of the pair of opposing sides of the body of the carriage comprises a guide slot adapted to slidably receive one of the channel lips therein.

In one form, the rail comprises a metal channel.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

In order to further understand the invention, preferred embodiments, will now be described. However, it will be realised that the scope of the invention is not confined or restricted to the details of the embodiments described below. Variations and alterations that would be readily apparent to a person skilled in the art are deemed as being incorporated within the scope of the invention.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Referring now to FIGS. 1 through 6, there is shown a mount assembly 1 for an engineering services item, such as an AHU of an HVAC system.

The mount assembly 1 comprises a base 2, an item attachment point 4 for the item (i.e. the AHU), and a resilient element 6 interposing the base 2 and the item attachment point 4, from which resilient element 6 the item attachment point 4 depends.

The base 2 comprises a body 8 of a rigid material such as a metal or a rigid plastic material, the base body 8 comprising a collar 10 with an internal (or female) screw thread 14 (see FIGS. 3 and 4) encircling an aperture (a circular bore) 12, and a flange 16 which encircles the collar 10. The flange 16 comprises a plurality of bolt holes 18, via which, in use, the base body 8 can be bolted to a ground/floor surface or a plinth. A rubber seal 19 (optional depending on the application) can be placed beneath the flange 16.

Figure 6:
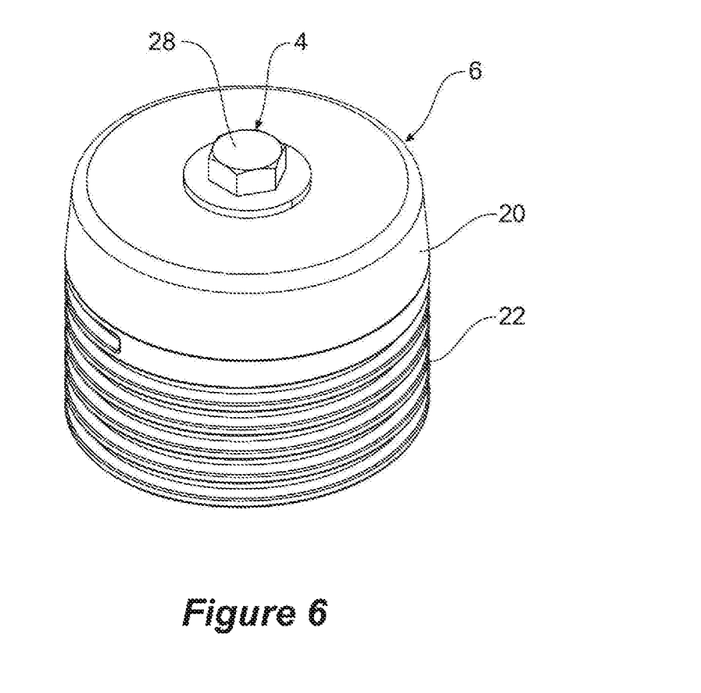
FIG. 6 is an isometric view of a resilient element from the mounting assembly of FIGS. 1 through 5.
Figure 7:
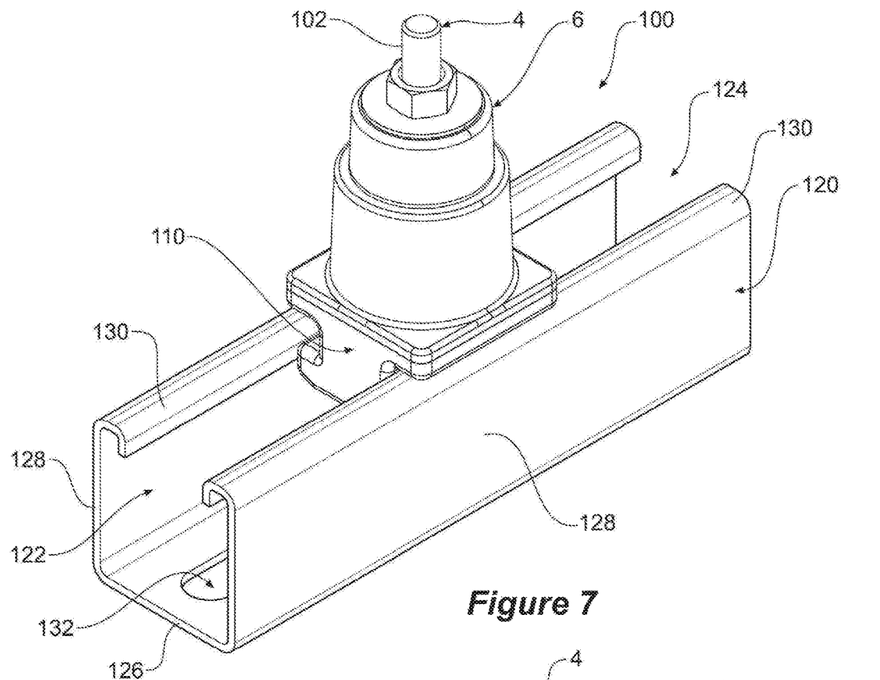
FIG. 7 is an isometric view of a mounting assembly according to a second embodiment of the invention.
Figure 8:
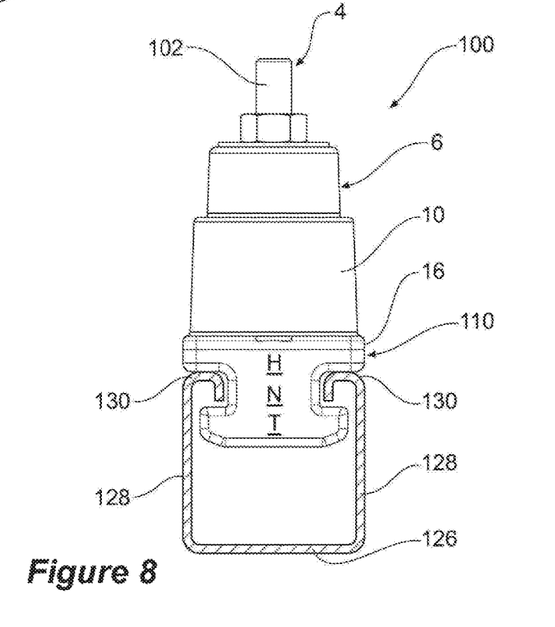
FIG. 8 is an end view of the mounting assembly of FIG. 7.

The resilient element 6 comprises a solid body 20 of a resilient, elastomeric material such as rubber, a synthetic rubber or a thermoplastic vulcanisate. With reference to FIG. 6, it can be seen that the solid body 20 comprises a cylindrical portion comprising an external (male) screw thread 22, where both the cylindrical portion and the external screw thread 22 are adapted or threadable engagement with (i.e. to screw into) the internal thread 14 of the collar 10.

Because they are moulded into the body 20, the screw threads 22 are coarse threads, with some clearance provided between the male and female threads 22 and 14 respectively.

Figure 1:
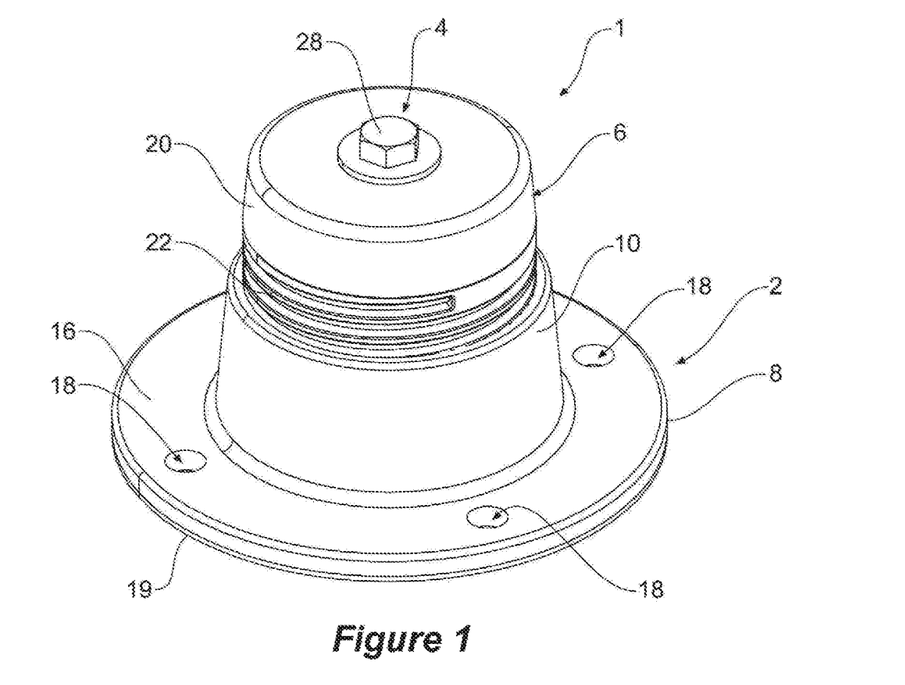
FIG. 1 is an isometric view of a mounting assembly according to a first embodiment of the invention.
Figure 2:
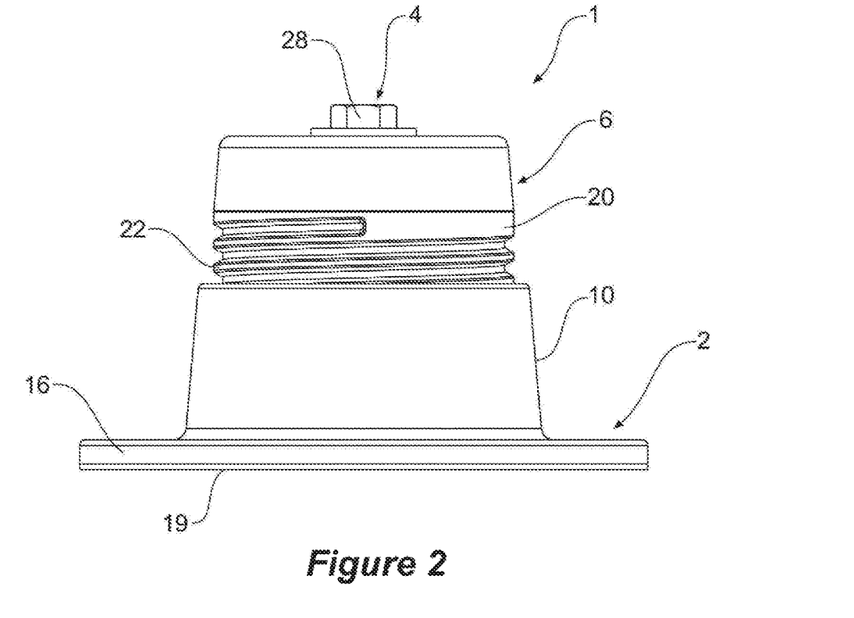
FIG. 2 is a side view of the mounting assembly of FIG. 1.
Figure 3:
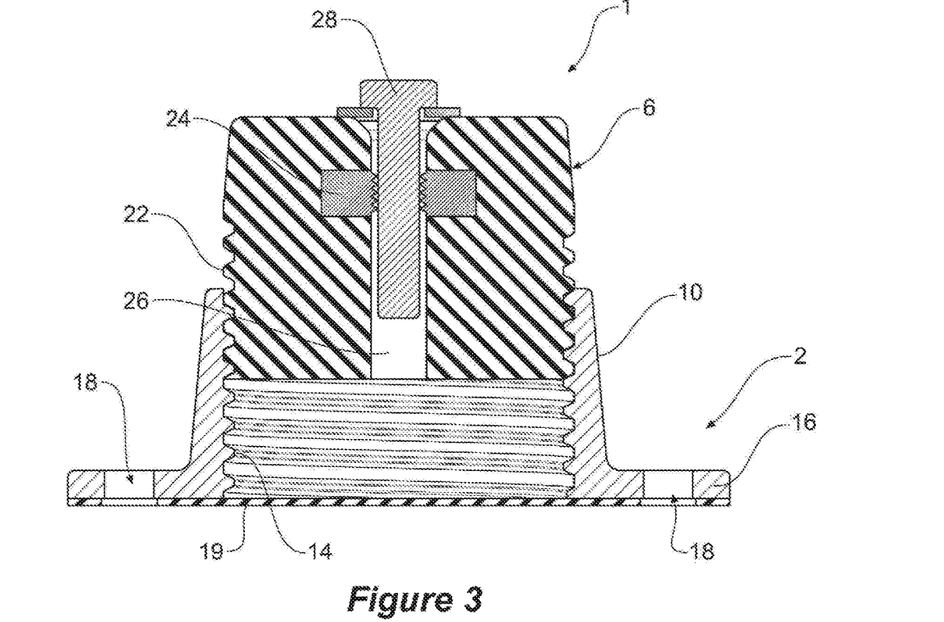
FIG. 3 is a cross-sectional view through the mounting assembly of FIGS. 1 and 2.
Figure 4:
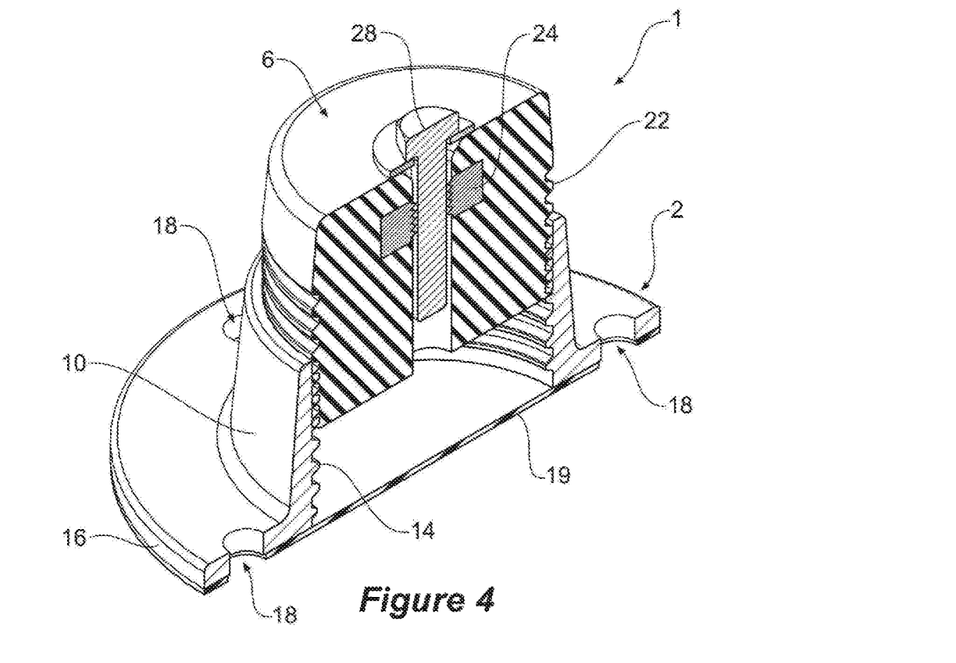
FIG. 4 is an isometric cross-sectional view through the mounting assembly of FIGS. 1 through 3.
Figure 5:
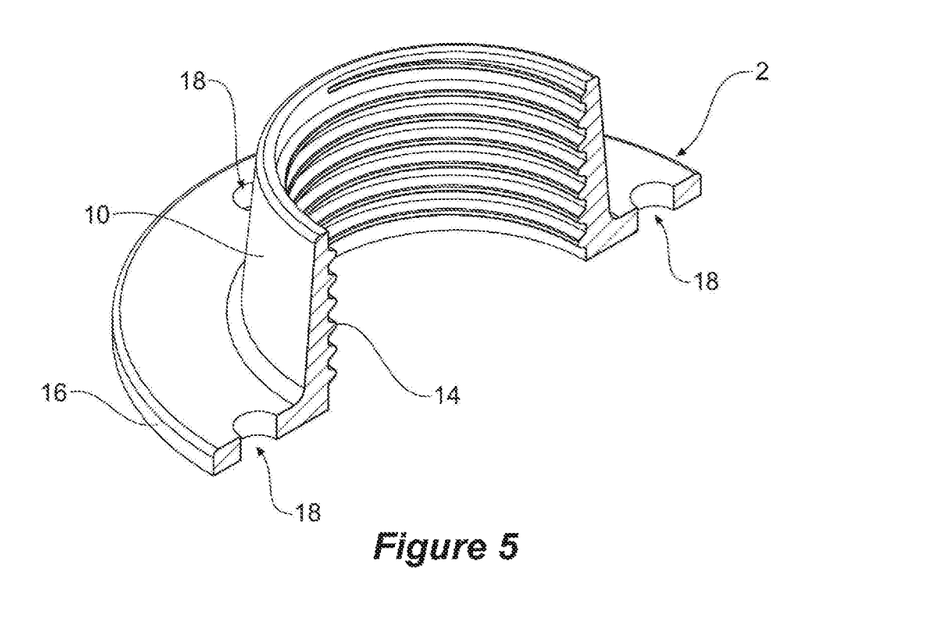
FIG. 5 is an isometric cross-sectional view through a base from the mounting assembly of FIGS. 1 through 4.

With reference to FIGS. 3 and 4, it can be seen that the item attachment point 4 comprises an item attachment member 24 in the form of, in this embodiment, a nut 24 for a fastener embedded in the solid body 20 of resilient element 6, and thus held captive by the resilient element 6. A bore 26 extends through the resilient element 6 to receive with, a clearance fit, a shank of a bolt 28 when this is threaded into the nut 24. Using a captive nut 24 as opposed to a captive bolt allows the bolt length to be selected to accommodate different air conditioning units.

A conventional outdoor unit of a split cycle air conditioner (one example of an AHU) comprises au elongate body provided with four feet, which are arranged into two pairs positioned at or towards opposing ends of the unit.

In use the flange 16 of the base 2 is bolted to one of a ground/floor/frame and a shank of a mounting bolt 28 is passed through a hole provided in each of the feet, and that bolt 28 is then screwed into the captive nut 24 of the resilient element 6.

The extent to which the resilient element 6 is screwed into the collar 10 can be selected as necessary to assist in levelling the outdoor unit. Optionally, a pair of opposing flat surfaces could be created on the resilient element 6 to facilitate its rotation with a spanner or wrench. In this way, each mount assembly 1 comprises a means for adjusting a height of a support level for the AHU.

In addition to facilitating height adjustment, the rigid collar 10 encircles and provides lateral support for the resilient element 6, and thus supports the resilient element 6 against premature failure of due to sideways loads of the type created in an earthquake, while not diminishing the vibration dampening of the resilient element 6.

In the event of seismic activity causing vibration of the ground and the base 2 in turn, the resilient element 6 will elastically deform without failing, while absorbing at least some of this vibration, so that not all is transmitted to the attachment point 4, and the AHU in turn. In this way, the likelihood of the AHU breaking free of its mounts and being damaged, or possibly even injuring others, is decreased. Moreover, during normal use, the resilient element 6 will absorb noise and vibration created by the rotating components of the AHU, such as a motor and a fan, and reduce transmission of these vibrations to the base 2.

Referring now to FIGS. 7 through 11, where there is shown a mount assembly 100 according to a further embodiment of the present invention. Those parts of the mount assembly 100 which are identical (or near-identical) to corresponding parts shown in the mount assembly 1 of FIGS. 1 through 6, will be denoted by the same reference numerals and will not be described again in detail.

Figure 9:
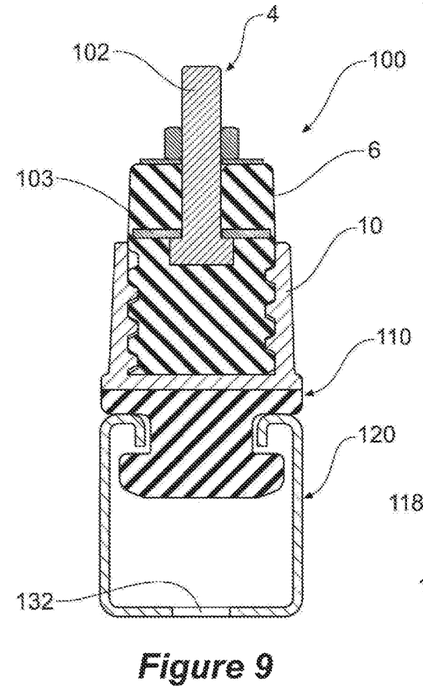
FIG. 9 is a cross-sectional end view of the mounting assembly of FIGS. 7 and 8.
Figure 10:
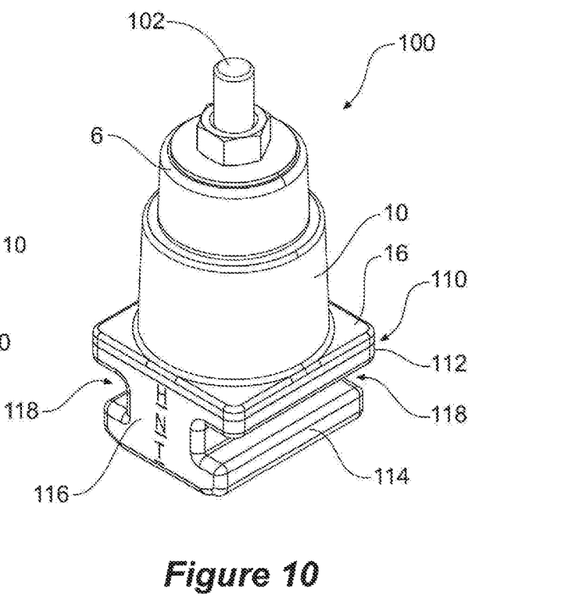
FIG. 10 is an isometric view of a mount from the mounting assembly of FIGS. 7 through 9.
Figure 11:
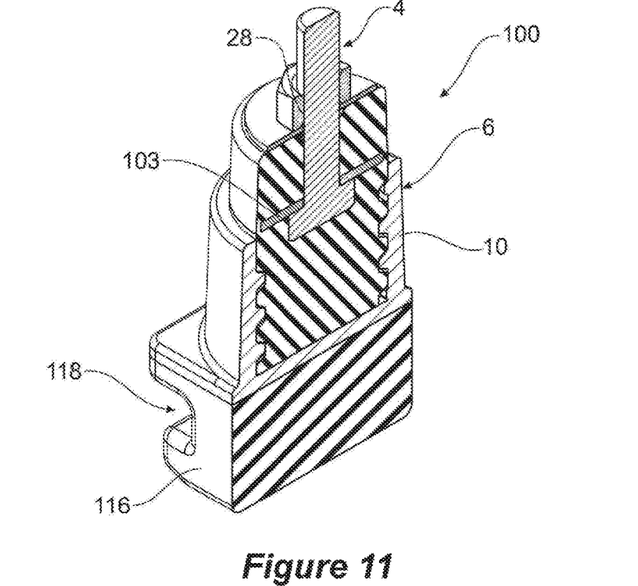
FIG. 11 is a cross-sectional view taken through the mount of FIG. 10.

With reference to FIGS. 9 and 11, it can be seen that the item attachment point 4 of mount assembly 100 comprises an item attachment point 4 in the form of a bolt 102 embedded head first (i.e. with its shank directed outward) in the resilient element 6, and thus held captive by the resilient element 6. A washer 103 is welded to the head of the bolt 102 to aid in resisting rotation.

It should be understood however, that the item attachment point 4 of mount assembly 100 may be the same as that of mount assembly 1 (described above), and vice versa.

The base 2 is secured with respect to a carriage 110, which is adapted for a sliding engagement with a support rail 120. This securement may be by way of any suitable method, including adhesive, co-moulding or fasteners.

The carriage 110 comprises a generally cuboid solid body 112 of resilient material such as rubber or a thermoplastic vulcanisate, comprising a pair of sides 114, a pair of ends 116, a top surface, and a bottom surface. Each side 114 of the body comprises a guide slot 118 which extends between the ends 116.

The support rail 120 comprises a channel 122 comprising a slot 124, and a substantially constant cross-sectional shape throughout its length. This cross-sectional shape comprises a floor 126, a pair of opposing sides 128, and an inwardly directed and downwardly curled lip 130 depending from each of the opposing sides 128. There are a plurality of through apertures 132 (slots in this embodiment) in the floor of the support rail. These apertures 132 permit drainage of any water that might be caught in the channel.

The guide slots 118 create a neck portion N for the carriage 110, which sits between a head portion H and a tail portion T of the carriage 110.

In use, the mount assembly 100 slidably engages the support rail 120. In doing so, the lips 130 of the support rail 120 locate in the guide slots 118, which undercut the tail portion T so that this (i.e. the tail portion) becomes captured by the support rail 120, while the head portion H of the carriage sits proud of the support rail 2.

So it is that the mount assembly 100 is slidably retained by the support rail 120, and in this way its position along the support rail 120 can be quickly and easily adjusted as required. As was the case with the embodiment of FIGS. 1 through 6, the extent to which the resilient element 6 is screwed into the collar 10 can be selected as necessary to assist in levelling the outdoor unit. In this way, each mount assembly 100 comprises a means for adjusting a height of a support level for the AHU.

In use, support rail 120 is secured (e.g. bolted or welded) to one of a ground/floor/frame, and the carriage 110 is slidably retained by the support rail 120. The position of the mount assembly 100 along the support rail 120 can then be quickly and easily adjusted as required, and the AHU secured to the bolt 102.

In the event of seismic activity causing vibration of the ground and the support rail 120 in turn, both the resilient element 6 and the carriage 110 will elastically deform without failing, while absorbing at least some of this vibration, so that not all is transmitted to the attachment point 102, and the AHU. In this way, the likelihood of the AHU breaking free of its mounts and being damaged, or possibly even injuring others, is decreased. Moreover, during normal use, both the resilient element 6 and the carriage 110 will absorb noise and vibration created by the rotating components of the AHU, such as a motor and a fan, and reduce transmission of these vibrations to the support rail 120.

Figure 12:
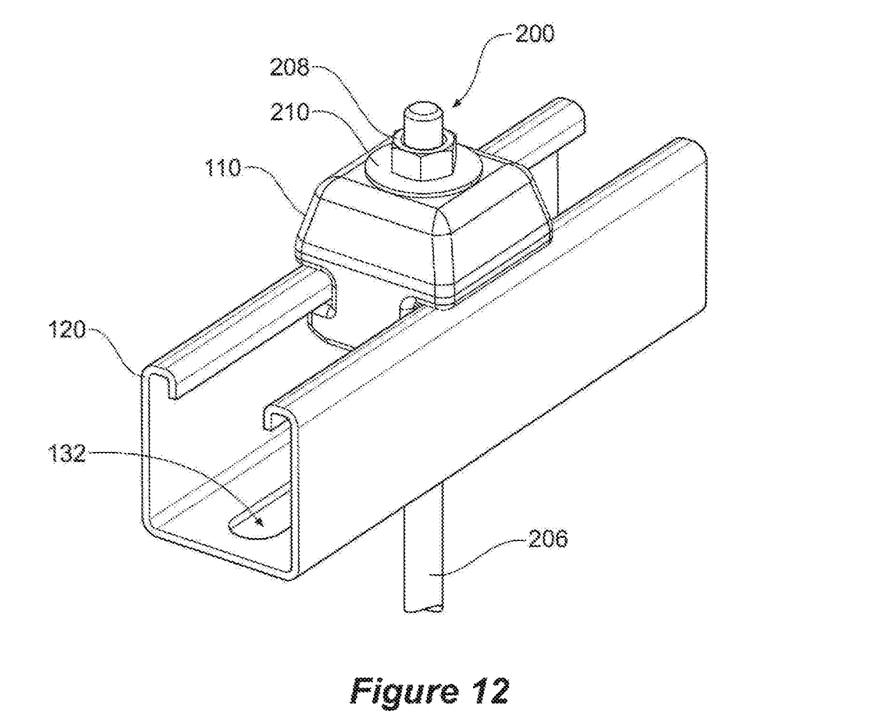
FIG. 12 is an isometric view of a mounting assembly according to a third embodiment, taken from an upper viewpoint.
Figure 13:
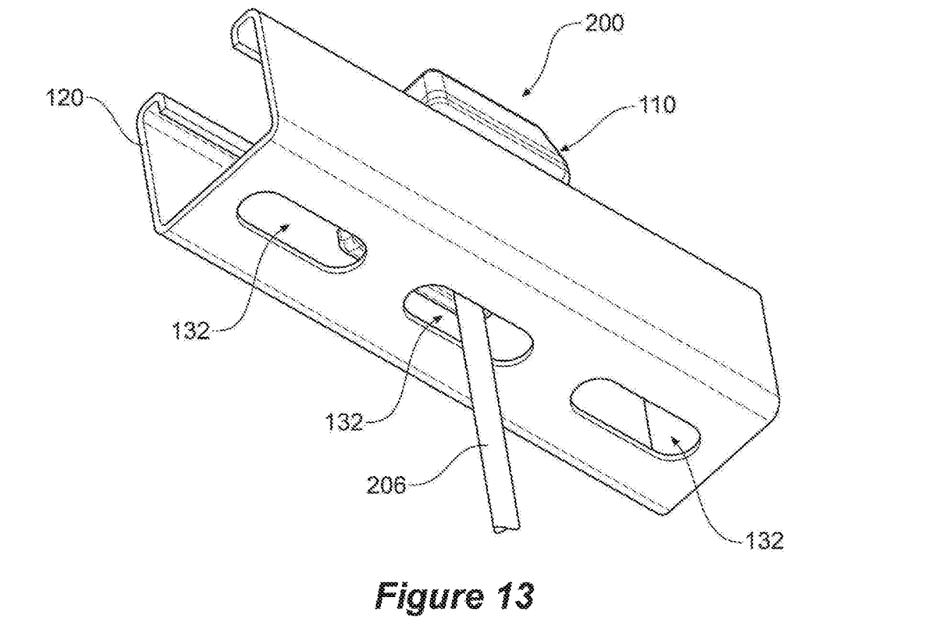
FIG. 13 is an isometric view of the mounting assembly of FIG. 12, taken from a lower viewpoint.
Figure 14:
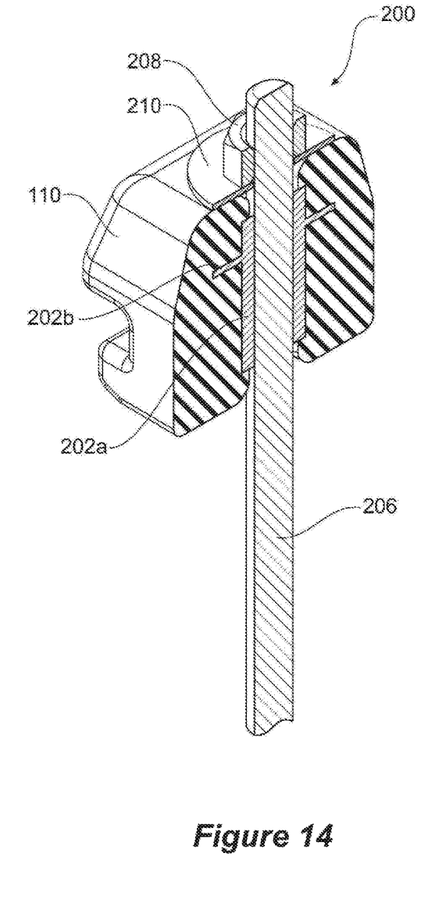
FIG. 14 is a cross-sectional view through a rod and a carriage from the mounting assembly of FIGS. 12 and 13.

Referring now to FIGS. 12 through 14, where there is shown a mount assembly 200 according to a further embodiment of the present invention. Those parts of the mount assembly 200 which are identical (or near-identical) to corresponding parts shown in the mount assembly 100 of FIGS. 7 through 11, will be denoted by the same reference numerals and will not be described again in detail.

Figure 15:
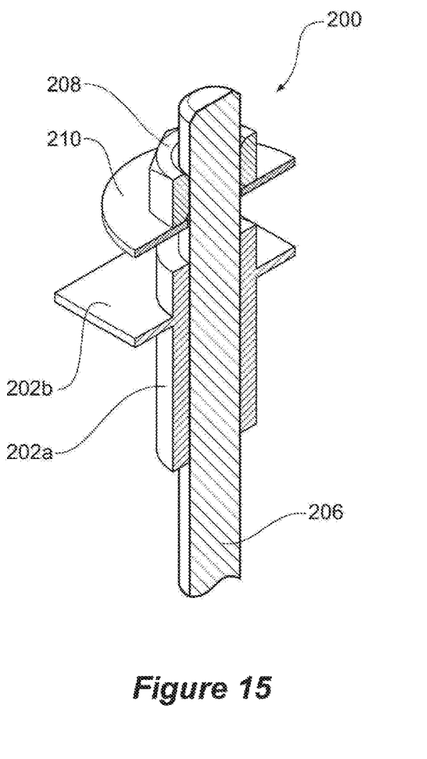
FIG. 15 is a cross-sectional view through the rod and a captive assembly from the mounting assembly of FIGS. 12 through 14, where the carriage has been removed to permit visibility of the captive assembly.

The item attachment point 4 of mount assembly 200 comprises a captive assembly 202 embedded in the carriage 110, and thus held captive by the carriage 110. The captive assembly 202 comprises a threaded bush 202a, and a washer 202b welded to the threaded bush 202a. Carriage 110 comprises a though bore 204 which is aligned with a threaded bore in the threaded bush 202a so that a threaded rod 206 can be threaded into the threaded bush 202a and passed through the carriage 110 via the bore 204. The position of the threaded rod 206 is fixed by a securing nut 208 and washer 210.

In use, support rail 120 is mounted in a suspended position and the mount assembly 200 slidably engages the support rail 120, with the threaded rod 206 extending down from the carriage 110 and through one of the apertures 132 in the support rail 120. In this way, an engineering services item such as, for example, a fan coil unit or a cassette unit of an HVAC system, can be suspended from the threaded rod.

Because the carriage 110 comprises a generally cuboid solid body 112 of resilient material interposing the threaded rod 206 and the support rail 120, mount assembly 200 can absorb violent shock loads associated with seismic activity such as an earthquake, without failing and dropping the suspended load onto people below.

Although the foregoing description describes use of the mount assembly as a mount for an outdoor unit of an air-conditioning system, its application is not so limited. For example, the base could be used for pumps, motors or other appliances that require anti vibration and support levelling, hence the use of the term 'engineering services'.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A mount assembly for an engineering services item, the mount assembly comprising:
   a base comprising a body of rigid material having an aperture comprising an internal screw thread and a collar encircling the aperture, wherein at least a portion of the collar contains the internal screw thread; and a resilient element comprising:
- a body of resilient material;
- an item attachment point comprising an attachment member, at least a portion of which is embedded in the body of resilient material; and
- an external screw thread formed into the body of resilient material and configured for threadable engagement with the internal screw thread of the base, such that the resilient element is screwed into the base and interposes the item attachment point and the base.

2. The mount assembly of claim 1, wherein the resilient element comprises a solid portion of the resilient material.

3. The mount assembly of claim 1, further comprising a carriage depending from the base and adapted to slide with respect to a support rail.

4. The mount assembly of claim 3, wherein the carriage is adapted to slidably engage the support rail.

5. The mount assembly of claim 3, wherein the carriage comprises a solid portion of a resilient material.

6. The mount assembly of claim 1, wherein the resilient material comprises an elastomeric material.

7. The mount assembly of claim 3, wherein the carriage is formed by a molding process.

8. The mount assembly of claim 7, wherein the carriage is molded to the base during the molding process of the carriage.

9. The mount assembly of claim 1, wherein the resilient element is formed by a molding process.

10. The mount assembly of claim 9, wherein the attachment member is molded into the resilient element during the molding process of the resilient element.

11. The mount assembly of claim 1, wherein the attachment member comprises a nut for a fastener.

12. The mount assembly of claim 1, wherein the attachment member comprises a bolt having a head embedded in the resilient element.

* * * * *

UNITED STATES PATENT AND TRADEMARK OFFICE
CERTIFICATE OF CORRECTION

PATENT NO.         : 10,378,609 B2
APPLICATION NO.    : 15/553130
DATED              : August 13, 2019
INVENTOR(S)        : W. T. Threadgold Page 1 of 1

It is certified that error appears in the above-identified patent and that said Letters Patent is hereby corrected as shown below:

On the Title Page

| Column | Line | Error |
|---|---|---|
| Item [57], Abstract | | "comprises a an aperture" should read |
| 2 | 4 | --comprises an aperture-- |

In the Specification

| | | |
|---|---|---|
| 1 | 49 | "thither" should read --further-- |
| 1 | 51 | "tot" should read --for-- |

Signed and Sealed this
Twenty-fifth Day of August, 2020

Andrei Iancu
*Director of the United States Patent and Trademark Office*